United States Patent
Burns et al.

(10) Patent No.: US 7,782,212 B2
(45) Date of Patent: Aug. 24, 2010

(54) RADIO FREQUENCY SEALING APPARATUS FOR A CONTAINER

(75) Inventors: Gary P. Burns, Rockford, MI (US); Peter Phaneuf, Grand Rapids, MI (US); Michael James Isabell, Grand Rapids, MI (US); Patrick Hornacek, Caledonia, MI (US)

(73) Assignees: Avery Dennison Corporation, Pasadena, CA (US); Performance Systematix, Inc., Grand Rapids, MI (US)

( * ) Notice: Subject to any disclaimer, the term of this patent is extended or adjusted under 35 U.S.C. 154(b) by 307 days.

(21) Appl. No.: 11/957,080

(22) Filed: Dec. 14, 2007

(65) Prior Publication Data

US 2009/0153334 A1    Jun. 18, 2009

(51) Int. Cl.
    *G08B 13/14* (2006.01)
(52) U.S. Cl. ............ 340/572.8; 340/572.1; 340/10.1; 340/10.5
(58) Field of Classification Search ........... 340/572, 340/10, 505
    See application file for complete search history.

(56) References Cited

U.S. PATENT DOCUMENTS

| 7,109,867 | B2 | 9/2006 | Forster |
| 2004/0046698 | A1 | 3/2004 | Martin et al. |
| 2005/0051624 | A1 | 3/2005 | Kipp et al. |
| 2007/0182563 | A1* | 8/2007 | Abbott ............ 340/572.8 |
| 2007/0182564 | A1* | 8/2007 | Abbott ............ 340/572.8 |

FOREIGN PATENT DOCUMENTS

| WO | 2006/016184 A2 | 2/2006 |
| WO | WO 2006016184 A2 * | 2/2006 |

OTHER PUBLICATIONS

International Search Report mailed May 25, 2009 from corresponding International Application No. PCT/US2008/086197.
Written Opinion of the International Searching Authority mailed May 25, 2009 from corresponding International Application No. PCT/US2008/086197.
Steve Cassidy: "*Inner Seal Technology and its Application to Improving Brand Security*" http://pei2006.packexpo.com/exhibitor/tracks)monday.html; Monday, Oct. 30th, Safety Issues Tracks 1:20PM-2:10 PM (M15).
DPN Design Product News: "*Snap-On Tamper-Evident, RFID Integrated, Plastic Cap for Vials*"; Thursday, Feb. 22, 2007, http://www.dpncanada.com/index.php?option=com_content&task=view&id=938&Itemid=146.
Rick Lingle: "*RFID-Enabled Vial Seat*"; Packworld.com Feb. 24, 2007; http://www.packworld.com/pring.php?id=19304.
Yottamark Product Fingerprints: "*The Solution*"; Feb. 24, 2007; http://www.drugid.com/solution.htm.

* cited by examiner

*Primary Examiner*—Benjamin C Lee
(74) *Attorney, Agent, or Firm*—Roberts Mlotkowski Safran & Cole, P.C.; Thomas W. Cole

(57) ABSTRACT

An RF security apparatus includes a covering membrane for overlying at least a portion of an opening in the container. The covering membrane has a sealing portion configured to be bonded to a mouth of the opening. An RF security device is coupled to the covering membrane. The RF security device is configured to emit a predetermined RF signal in response to an RF interrogation signal.

23 Claims, 2 Drawing Sheets

RADIO FREQUENCY SEALING APPARATUS FOR A CONTAINER

FIELD OF THE INVENTION

The present invention relates to automatic identification technology and, more specifically, to a radio frequency security apparatus and methodology for a container.

BACKGROUND

Automatic identification is the broad term applying to a host of technologies that are used to help machines identify objects. Automatic identification is often coupled with automatic data capture. Accordingly, companies that want to identify items are able to capture information about the items and to load the information into a computer with minimal human labor.

One type of automatic identification technology is radio frequency identification ("RFID"). RFID is a generic term for technologies that use radio waves to automatically identify objects such as specially tagged products. There are several conventional methods of identifying objects using RFID, the most common of which is to store a serial number (and other information if desired) that identifies the object on a microchip that is attached to an antenna. The chip and the antenna, together with any supporting substrate, are commonly called an RFID device or an RFID tag. The antenna enables the chip to transmit the identification information to a reader. The reader converts the radio waves from the RFID device into a form that can then be utilized by a computer.

RFID devices include active tags, which include a power source, and passive tags, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory, and the like. RFID tags and labels also can be characterized as either those to which information is written only once (although the information may be read repeatedly) or those to which information may be written during use. For example, RFID tags may store environmental data (that may be detected by an associated sensor), logistical histories, state data, and the like.

As the name implies, electronic article surveillance ("EAS") is concerned with the embedding or attaching of a (usually inexpensive and disposable) security label or tag to the object to be tracked. Conventional EAS devices or tags include a resonator that, when activated, produce a signal when the EAS tag is brought within operative proximity of detection apparatus. For example, an EAS tag may be used to discourage shoplifting by causing an alarm to sound when an item containing such a tag is removed from a store without the EAS tag having been deactivated in the checkout process. Generally, EAS tags just provide a binary present/absent signal, with no data included in the signal, in contrast to the RFID tags.

Many items in the marketplace are packaged, singly or in bulk, in a container for shipping and/or storage. The manufacturers, distributors, retailers, and/or customers may wish to monitor or identify the containers at various points throughout the distribution chain of the items. For example, and as will be referenced throughout for illustrative purposes, pharmaceutical manufacturers commonly package pills or liquids in bottles. It should be understood however, that a variety of other consumer goods, such as personal care products, human and animal consumable food products, dietary supplements, and the like, can be packaged in containers.

Pharmaceuticals are very valuable, both monetarily and in terms of their therapeutic value, and are often targeted for counterfeiting, theft, adulteration, and other tampering. For example, medicine of one potency may be repackaged, and (intentionally) mislabeled, as the same medicine of a higher potency and thus can be sold for a higher price. Authentic (and expensive) medicine may be replaced with cheap look-alike pills, which might be devoid of the active ingredient labeled on the container and may even contain substances harmful to the consumer. A few pills could simply be stolen from each container of a shipment. These and many other schemes are used by counterfeiters, thieves, and other adverse parties ("tampering agents"), and result in financial and health risks to the public.

Therefore, it is important for a consumer to have some assurance that the contents of the container are in their original condition as intended by the manufacturer. Commonly used tamper-resistant means currently focus on sealing membranes adhered over the container's opening to seal the contents inside. The membranes are intended to break when the contents of the container are accessed and thereby indicate that tampering may have taken place. However, tampering agents have become quite sophisticated and often can replace or recreate a sealing membrane so expertly that the consumer is unlikely to discover the deception.

In addition, it may be desirable for a pharmaceutical container to include automatic identification technology, as inventory control systems throughout the entire pharmaceutical supply chain are growing to depend more on electronic identification and verification of medications. For example, an automated warehouse system may electronically detect the active ingredient and strength of a package of medication to allow that container to be stored with other, similar products or to ensure that the correct medication is selected by the system for dispensation. Additionally, a customs or inventory person may use an electronic identification scanner to ensure that all of the containers of medicine in a carton are the same. In this way, both mistakes (e.g., mislabeling) and intentional deceptions can be detected and corrected before the improper medication reaches the consumer.

BRIEF SUMMARY OF THE INVENTION

In an embodiment of the present invention, a radio frequency ("RF") security apparatus for a container is described. The RF security apparatus includes a covering membrane for overlying at least a portion of an opening in the container. The covering membrane has a sealing portion that is configured to be bonded to a mouth of the opening. An RF security device is coupled to the covering membrane. The RF security device is configured to emit a predetermined RF signal in response to an RF interrogation signal.

In an embodiment of the present invention, a radio frequency (RF) security apparatus for a container is described. A covering membrane for overlying at least a portion of an opening in the container is provided. The covering membrane has a sealing portion configured to be bonded to a mouth of the opening. An outer cap covers the covering membrane and the opening. An RF security device is coupled to the outer cap. The RF security device is configured to emit a predetermined RF signal in response to an RF interrogation signal.

In an embodiment of the present invention, a container is described. The container includes a body and an opening in the body to access an interior of the body. The opening has a mouth. A covering membrane overlies at least a portion of the opening and has a sealing portion bonded to the mouth of the opening. An RF security device is coupled to the covering membrane. The RF security device is configured to emit a predetermined RF signal in response to an RF interrogation signal.

In an embodiment of the present invention, a method of providing a radio frequency (RF) security apparatus for a container is described. A covering membrane is provided for overlying at least a portion of an opening in the container. A sealing rim of the covering membrane is bonded to a mouth of the opening. An RF security device is coupled to the covering membrane. The RF security device is configured to emit a predetermined RF signal in response to an RF interrogation signal.

In an embodiment of the present invention, a radio frequency (RF) security apparatus for a container is described. A first membrane is configured to at least partially cover an opening of the container. A second membrane is at least partially disposed on the first membrane. A radio frequency device is placed between the first and second membranes to form the RF security apparatus. The RF security apparatus is at least partially affixed to the opening of the container.

Other features and advantages of the present invention will become apparent to those skilled in the art from a consideration of the following detailed description taken in conjunction with the accompanying drawings.

DETAILED DESCRIPTION OF THE INVENTION

The present invention relates to radio frequency identification ("RFID") systems, including RFID tags, readers, and activators. The invention also relates to electronic article surveillance ("EAS") systems, including EAS tags, alarms, activators, and deactivators. The invention also relates to radio frequency security apparatus and methodology for a container, and such a use will be presumed herein, for clarity of description.

Figure 1:
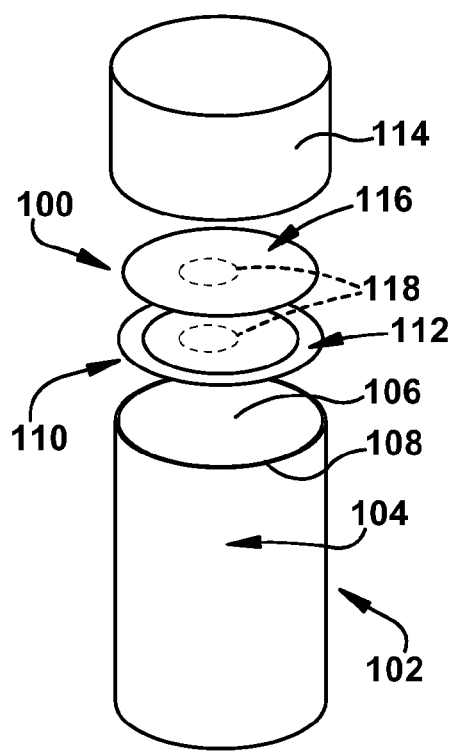
FIG. 1 is an exploded perspective view of an embodiment of the present invention.

In accordance with a first embodiment of the present invention, FIG. 1 depicts an exploded perspective view of a radio frequency ("RF") security apparatus 100 for a container 102. The container 102 has a body 104 and an opening 106 in the body to access an interior (not shown) of the body. The opening 106 has a mouth 108. The container 102 may have any suitable shape, size, material, or other characteristics as desired for a particular application of the present invention.

The RF security apparatus 100 includes a covering membrane 110 for overlying at least a portion of the opening 106 in the container 102. An example of a suitable covering membrane 110 is an induction seal such as those available from Performance Systematix, Inc. of Grand Rapids, Mich. The covering membrane 110 has a sealing portion or rim 112 configured to be bonded to a mouth 108 of the opening 106. As used herein, the term "bond" means "to cause to adhere firmly". Two bonded members may directly contact each other, or there may be some intervening structure therebetween. The bond between the sealing rim 112 and the mouth 108 may be releasable, to allow at least a portion of the covering membrane 110 to be peeled from the opening 106, or may be substantially permanent, requiring that at least a portion of the covering membrane be damaged or destroyed during removal from the opening.

The covering membrane 110 may be bonded to the container 102, directly or with one or more intervening members, using an induction heat seal, a pressure sensitive seal, a heat-sealed plastic seal, an interference-fit seal, an adhesive seal, or any other suitable type of seal or combination thereof. Particularly (but not exclusively) when induction heat sealing is used, the covering membrane 110 or a portion thereof may be metallic, to facilitate a desired sealing action between the covering membrane and the container 102. The covering membrane 110 may overlie all or any portion of the opening 106; in the latter case, the covering membrane may be configured as a ring, optionally substantially comprising only the sealing rim 112 area. The covering membrane 110 may comprise at least a portion of an inner liner seal, such that the inner liner seal and the opening 106 of the container 102 may be covered by an optional outer cap 114. The outer cap 114, when present, may be of a child-resistant, tamper-evident, one-time-use, reusable, or any other suitable type.

Whether or not an outer cap 114 is provided, an auxiliary seal 116 may be provided as part of the RF security apparatus 100. When present, the auxiliary seal 116 may help seal the interior of the container 102 from environmental factors, such as air, moisture, and the like as well as prevent degradation of the contents and preserve freshness of the material.

The RF security apparatus 100 also includes an RF security device 118 coupled to the covering membrane 110. Two optional placements of an RF security device 118 are depicted in FIG. 1 in phantom line, one with the covering membrane 110 and one with the auxiliary seal 116. One or more RF security devices 118 could be provided for a single RF security apparatus 100, and could be located in any suitable position and orientation with respect to other structures of the RF security apparatus. The RF security device 118 could be coupled to the covering membrane 110 in any suitable manner, either directly or with one or more intervening members. Alternatively, the RF security device 118 could be enclosed within a pocket created between two adjacent covering membranes 110, the pocket being attached to the container 102 by at least one of the covering membranes.

The RF security device 118 is configured to emit at least one predetermined RF signal in response to an RF interrogation signal generated by an outside interrogating source (not shown). The RF security device 118 could be a passive tag, an active tag, a battery assisted passive tag, or any desired combination thereof. The RF security device 118 could be at least one of a radio frequency identification ("RFID") tag and an electronic article surveillance ("EAS") tag.

Figure 2:
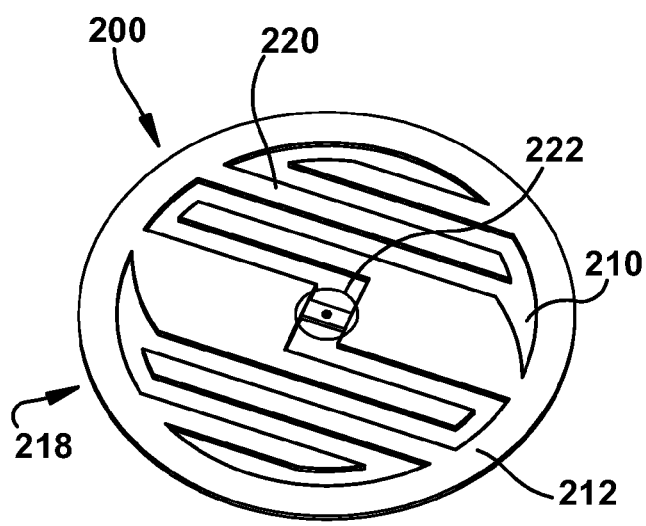
FIG. 2 is a partial perspective view of a component in a first configuration for use with any embodiment of the present invention.

An example of a first configuration of a suitable RF security apparatus 200 is depicted in FIG. 2. The RF security device 218 shown in FIG. 2 includes an antenna 220 operatively coupled to an RF chip 222. In the first configuration, at least a portion of the RF security device 218 is formed integrally with the covering membrane 210. For example, and as shown in FIG. 2, the covering membrane 210 is configured to form at least a portion of the antenna 220 of the RF security device; in such instance, it may be desirable for the covering membrane 210 to be formed by a metallic material and/or a metallized film, such as an aluminum coating applied to a polyethylene terephthalate material. The antenna 220 may form at least a portion of the sealing rim 212. The antenna 220 may be formed at least partially as a cut-out pattern of the covering membrane 210, as in the first configuration of the RF security apparatus 200. Regardless of the manner in which the antenna 220 is formed, however, the RF chip 222 is coupled to the antenna 220, for example, via direct chip attach or through the use of interposer straps, to form the RF security device 218.

Figure 3:
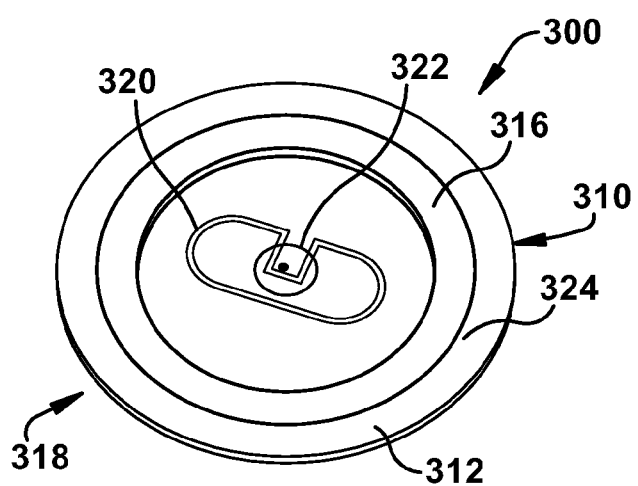
FIG. 3 is a partial perspective view of a component in a second configuration for use with any embodiment of the present invention.

In FIG. 3, an alternate, second example configuration of the RF security apparatus 300 is shown. In the second configuration of FIG. 3, the RF security apparatus 300 is constructed differently than in the first configuration illustrated in FIG. 2. As shown in FIG. 3, the covering membrane 310 comprises a ring 324. The ring 324 serves as a sealing rim 312 and, as such, may include means for bonding to the mouth 108 of the opening 106 such as, but not limited to, an induction heat seal, a pressure sensitive seal, a heat-sealed plastic seal, an interference fit seal, an adhesive seal, or any other suitable type of seal or combination thereof. The ring 324 may be configured as desired for the chosen sealing method(s); for example, at least when the sealing rim 312 is bonded to the mouth 108 through induction heat sealing, the ring 324 may be metallic.

The RF security apparatus 300 shown in FIG. 3 includes an auxiliary seal 316. The auxiliary seal 316 and the RF security device 318 overlay the covering membrane 310. For example, and as depicted in FIG. 3, the auxiliary seal 316 may be configured to suspend all or a portion of the RF security device 318 in a laterally spaced relationship with the ring 324. The auxiliary seal 316 may be particularly useful to electrically separate the antenna 320 from the ring 324 and, as such, may be made of a non-metallic material.

The auxiliary seal 316 may be formed integrally with either or both of the covering membrane 310 and the RF security device 318. The RF security device 318 may be located on the same surface of the auxiliary seal 316 as the covering membrane 310 or may be separated from the covering membrane 310 by the auxiliary seal 316. As an alternative to the depicted arrangement, and particularly when the auxiliary seal 316 is used to electrically separate the antenna 320 and the ring 324, the auxiliary seal may be made of a nonmetallic material. In such case, the antenna 320 could overlie the covering membrane 310 with no lateral separation between the antenna and the ring 324 but with the auxiliary seal 316 interposed therebetween.

In either of the first and second configurations of the covering membrane 210 and 310, or in any other desired configuration of the covering membrane, the antenna 220, 320 of the RF security device 218, 318 may be designed to account for transmission interference due to metallic portions of other components of the container 102 and/or the RF security device, such as the ring 324 depicted in FIG. 3. For example, since the ring 324 (when metallic) will detune the performance of an antenna designed to work in free air, the antenna 220, 320 can be designed to compensate for this detuning. When the ring 324 is metallic and is configured as part of the RF security device 218, 318, the ring may also or instead be electrically coupled to induce current to/from another metallic ring (not shown) and/or the antenna 220, 320 for receiving and/or emitting RF signals.

Figure 4:
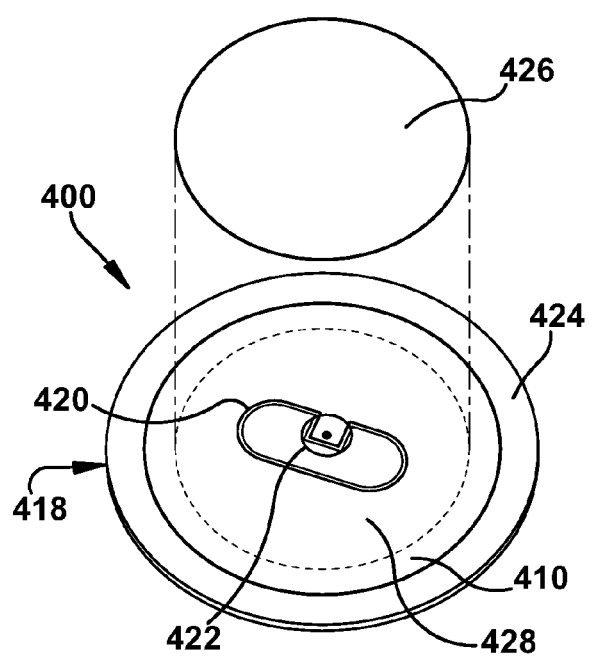
FIG. 4 is a partial exploded view of a component in a third configuration for use with any embodiment of the present invention.

In FIG. 4, an alternate, third example configuration of the RF security apparatus 400 is shown in exploded view. In the RF security device 418 shown in FIG. 4, the antenna 420 and RF chip 422 may be formed as an inlay (a preconfigured RFID device) and then the inlay can be placed directly on the covering membrane 410 and optionally adhered thereto, such as by adhesive. A second film layer or membrane 428 may then be disposed upon the antenna 420 and chip 422 to enclose the inlay within a pocket (located generally, when assembled, at 426). The pocket 426 may be formed by partially or wholly sealing or bonding the covering membrane 410 and second membrane 428 together in any suitable manner with at least a portion of the inlay sandwiched therebetween. Optionally, and when the second membrane 426 is approximately the same diameter as the covering membrane 410, the pocket 426 may be formed by attachment of the second membrane to the covering membrane by the ring 424. This pocket 426 may include an air space around the inlay which may allow the inlay to "float" or move slightly within the air pocket and thus protect the inlay from mechanical damage when the cap 114 is attached to the container 102. The covering membrane 410 may be attached to the container 102 with the attached pocket 426 (and inlay contained therein) in any suitable orientation.

Figure 5:
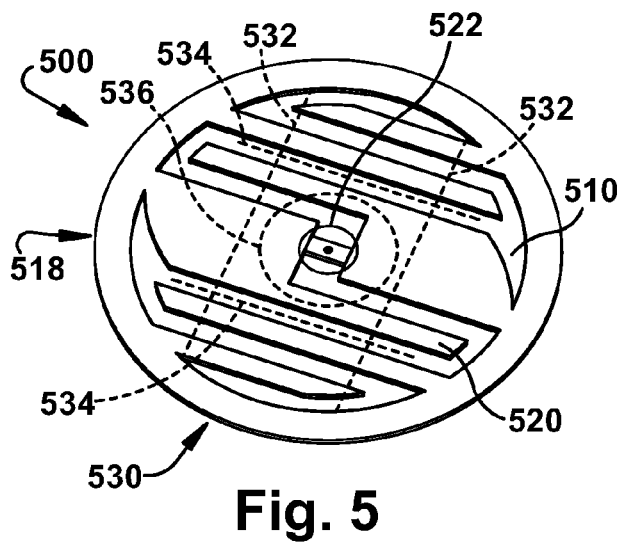
FIG. 5 is a partial perspective view of a component in a fourth configuration for use with any embodiment of the present invention.

In FIG. 5, an alternate, fourth example configuration of the RF security apparatus 500 is shown. As depicted in FIG. 5, the antenna 520 of the RF security device 518 could include a deactivation feature 530 which actuates when the interior of the container 102 is accessed through the opening 106. Suitable deactivation features 530 include, but are not limited to, a perforation line, a score line, or a punch line extending across at least a portion of the antenna 520, which is configured to separate responsive to a predetermined pressure. For example, one or more full perforation lines 532 could extend completely across the antenna 520, one or more partial perforation lines 534 could extend across a portion of the antenna, one or more curved perforation lines 536 could be located adjacent the RF chip 522 (optionally extending between the RF chip and at least a portion of the antenna), or any combination of these could be used. When the covering membrane 510 is configured to form at least a portion of the antenna 520 of the RF security device 518, the deactivation feature 530 may be formed with, and/or extend across, at least a portion of the covering membrane 510. The deactivation feature 530 may be formed with, and/or extend across at least a portion of the antenna 520. It is contemplated, for example, that an RF security device 518 could be coupled to a covering membrane 510 on which a deactivation feature 530 is provided as a predetermined pattern of perforation lines 532, 534, and/or 536.

Actuation of the deactivation feature 530, when present, may either render the RF security device 518 unable to emit a radio frequency signal or may substantively change the radio frequency signal which the RF security device emits. For example, an actual or attempted breach of the covering membrane 510 could be sufficient to break portions of the covering membrane 510 and/or antenna 520. Thus, an RF security device 518 may be deactivated and thereby rendered unable to emit the predetermined RF signal in response to a generated RF interrogation signal. The interrogator is then alerted to possible tampering with the contents of the container 102. Deactivation of the RF security device 518 may also address privacy concerns of individuals by eliminating the ability of the RF security apparatus 500 to emit a signal once the container 102 has been opened by a legitimate consumer.

When the RF security device 218, 318, 418, 518 is an RFID tag, the emitted RF signal could include identifying information and/or other data as desired by a user. For example, an RFID RF security device 218, 318, 418, 518 could identify the type and potency of medication packaged within the container. When the RF security device 218, 318, 418, 518 is an EAS tag, the emitted RF signal could help reveal shoplifting or other theft of the container 102, or could simply indicate whether the covering membrane 210, 310, 410, 510 or another portion of the container 102 and/or RF security device has been tampered with.

One of ordinary skill in the art could readily design a suitable RF security apparatus, similar to or different from any or all of the first through fourth configurations, for a desired application of the present invention. It should be intuitively obvious that the depicted first through fourth configurations are merely given by way of example, may be used in any embodiment of the present invention, and do not limit the scope of the attached claims in any manner.

An RF security apparatus 100 according to the first embodiment depicted in FIG. 1, or any embodiment of the present invention, may be assembled in advance and be bonded to a container 102 as a unit, or may be assembled directly onto the container 102. For example, and returning to the exploded view of FIG. 1, a container 102 may be provided, with a desired product (e.g., pharmaceutical pills, consumable food products, personal care items, liquids, solids, powders, capsules, carbonated materials, etc.) contained therein. A covering membrane 110 is provided for overlying at least a portion of an opening 106 in the container 102. A sealing rim 112 of the covering membrane 110 is bonded, releasably or permanently, to the opening 106 (e.g., to a mouth 108 of the opening) in any desired manner. An RF security device 118 is coupled to the covering membrane 110 in any suitable manner. The RF security device 118 may be located adjacent the container 102, or the covering membrane 110 may be interposed between the container and at least a portion of the RF security device, as shown in FIG. 1. The RF security device 118 may be configured to emit a predetermined RF signal in response to an RF interrogation signal at any time before, during, and/or after the assembly of the RF security device 118 into the RF security apparatus 100.

At any point during assembly of the container 102 and the RF security device 118, any desired additional membranes or structures (not shown) may be located and/or attached adjacent or near the mouth 108 of the container and/or the RF security device. For example, a product literature insert may be removably adhered to the RF security device on an opposite side thereof from the container 102. As another example, a second covering membrane (not shown) or another film or membrane could be provided to form a pocket, in cooperation with the covering membrane 110, in which at least a portion of the RF security device 118 could be disposed. An outer cap 114 may be provided and, when present, may serve to protect the RF security apparatus 100 and/or the container 102 (or contents thereof) from environmental factors (e.g., moisture or physical pressure). When present, the outer cap 114 may include tamper-resistant and/or electronic identification features intended to supplement and/or function redundantly to the RF security apparatus 100.

Figure 6:
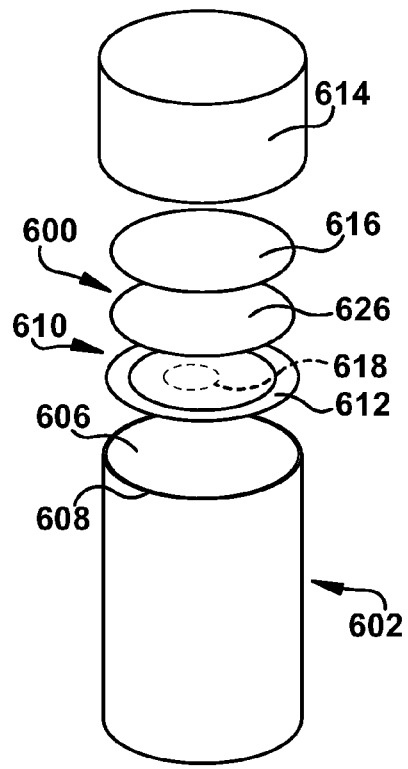
FIG. 6 is an exploded perspective view of another embodiment of the present invention.

FIG. 6 depicts an exploded perspective view of an RF security apparatus 600 in accordance with a second embodiment of the present invention. Features of FIG. 6 similar to those described with reference to FIGS. 1-5 are given similar reference numbers, with the first digit of the reference number indicating the Figure in which that element can be found. Description of common elements and operation similar to those in the previously described embodiment will not be repeated with respect to the second embodiment.

The RF security apparatus 600 of the second embodiment includes an intermediate sealing member 638, shown in FIG. 6 as being interposed between at least a portion of the covering membrane 610 and the RF security device 618. The intermediate sealing member 638 may be used to provide desired permeability characteristics to the sealed container 602, may serve to electrically insulate at least a portion of the covering membrane 610 from the RF security device 618, may aid in manufacturing or assembly of the RF security apparatus 600 or container 602, or may serve any other desired purpose.

For example, when the container 602 is a bottle configured to carry an injectable liquid, the covering membrane 610 may be a self-healing stopper (not shown) frictionally engaged with the mouth 608 of the container 602, such as a known bottle commonly used to store and transport insulin. The intermediate sealing member 638 for such a bottle could take the form of a collar (not shown, but commonly a thin metal collar) which at least partially encloses both the stopper and the mouth 608 of the bottle, affixing the stopper to the bottle in a protective manner. When the container 602 is of this known type, the RF security device 618 may be coupled to the covering membrane 610 in such a way that any attempt to access the contents of the container 602 will require removal or destruction of the RF security device. For example, the RF security device 618 could be bonded, directly or through an intermediate member (not shown) to the intermediate sealing member 638.

The RF security apparatus 600 of the second embodiment may be assembled similarly to that of the first embodiment. Namely, the RF security apparatus 600 may be assembled in advance and be bonded to a container 602 as a unit, or may be assembled directly onto the container 602. For example, as shown in the exploded view of FIG. 6, a container 602 may be provided, with a desired product contained therein. A covering membrane 610 is provided for overlying at least a portion of an opening 606 in the container 602. A sealing rim 612 of the covering membrane 610 is bonded, releasably or permanently, to the opening 404 (e.g., to a mouth 608 of the opening) in any desired manner. An intermediate sealing member 638 is attached to the covering membrane 610. An RF security device 618 is coupled to the covering membrane 610 in any suitable manner, optionally with the intermediate sealing member 638 interposed therebetween. The RF security device 618 may be located adjacent the container 602, or the covering membrane 610 and the intermediate sealing member 638 may be interposed between the container and at least a portion of the RF security device, as shown in FIG. 6. The RF security device 618 may be configured to emit a predetermined RF signal in response to an RF interrogation signal at any time before, during, and/or after the assembly of the RF security device 618 into the RF security apparatus 600. An outer cap 614 and/or one or more auxiliary seals 416 may be provided.

Figure 7:
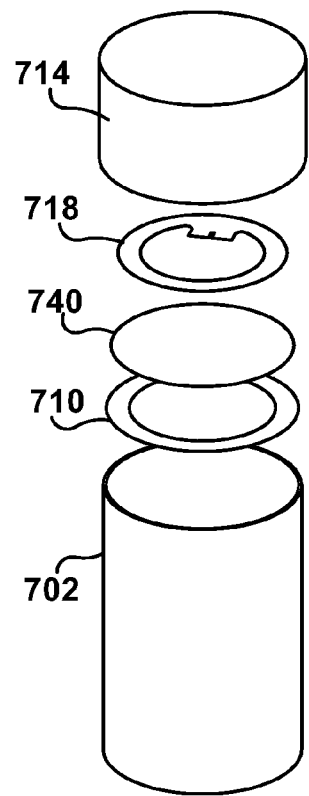
FIG. 7 is an exploded perspective view of another embodiment of the present invention.

FIG. 7 depicts an exploded perspective view of an RF security apparatus 700 in accordance with a third embodiment of the present invention. Features of FIG. 7 similar to those described with reference to FIGS. 1-6 are given similar reference numbers, with the first digit of the reference number indicating the Figure in which that element can be found. Description of common elements and operation similar to those in the previously described embodiments will not be repeated with respect to the third embodiment.

The container 702, shown in FIG. 7, is provided with a covering membrane 710. An outer cap 714 covers the covering membrane 710 when selectively associated with the container 702. An RF security device 718 is coupled to the outer cap 714. The RF security device 718 may be adhesively adhered or otherwise attached to an inner surface (not shown) of the outer cap 714. Alternatively, the RF security device 718 may simply be friction fit into the outer cap 714. As shown in FIG. 7, a cap liner 712 may be associated, permanently or temporarily, with the outer cap 714 to help hold the RF security device 718 in place within the outer cap and/or to serve as a barrier between the RF security device 718 and the covering membrane 710.

Any structures shown and described herein, and/or equivalents thereof, may be constructed in any suitable manner and of any suitable materials, having any suitable material properties. For example, nonmetallic materials such as, but not limited to, polyester (such as polyethylene terephthalate, a.k.a. "PET"), high-density polyethylene, low density polyethylene, polyurethane, or any combinations thereof, could be used for nonmetallic portions of the RF security apparatus 100, 200, 300, 400, 500, 600, 700 and/or the container 102, 602, 702. When certain electrical properties are desired, nonmetallic or other non-conductive materials could be used to appropriately control or block transmission electrical signals between portions of the RF security apparatus 100, 200, 300, 400, 500, 600, 700. As another example, it may be desirable for the contents of the container 102, 602, 702 to be protected from a surrounding atmosphere by a non-permeable seal. In such case, any suitable structures (e.g., all or portions of the RF security apparatus 100, 200, 300, 400, 500, 600, 700) may be made of a material or combination of materials selected for appropriately low oxygen and moisture transmission rates to provide the desired non-permeability. As yet another example, the intermediate sealing member 638 could be formed of a rigid and/or puncture-resistant material to protect the covering membrane 610 from being breached, particularly when no outer cap 614 is provided.

Those of ordinary skill in the art will understand that the preceding embodiments of the present invention provide the foundation for numerous alternatives and modifications thereto, and that features of various embodiments of the RF security apparatus 100, 200, 300, 400, 500, 600, 700 can be used together in any suitable combination. For example, it is contemplated that the covering membrane 110, 210, 310, 410, 510, 610, 710, when in a ring-like configuration, could overlie only the mouth 108, 608 of the opening 106, 606. There may be additional metallic and/or non-metallic layers interspersed between and/or adjacent to the mouth 108, 608 of the opening 106, 606 and the RF security apparatus 100, 200, 300, 400, 500, 600, 700. The RF security device 118, 218, 318, 418, 518, 618, 718 may have any desired size, shape, position, orientation, and/or other properties in relation to other structures of the RF security apparatus 100, 200, 300, 400, 500, 600, 700 or the container 102, 602, 702. For example, the RF security device 118, 218, 318, 418, 518, 618, 718 is shown in the Figures as being of similar diameter to the covering membrane 110, 210, 310, 410, 510, 610, 710 for ease of depiction, but these structures could have a variety of relative diameters.

The RF security apparatus 100, 200, 300, 400, 500, 600, 700 could retain and/or convey any suitable information, in a read-only and/or read-write manner as desired. Though certain structures of the RF security apparatus 100, 200, 300, 400, 500, 600, 700 are depicted schematically in the Figures as being thin, solid discs or rings, these structures, and any other structures of the RF security apparatus 100, 200, 300, 400, 500, 600, 700 as desired, could have any regular or irregular cross-sectional shape, footprint, combination of materials/layers, or other structural properties, and be attached, connected, and/or affixed to each other in any suitable manner. Any structure(s) of the present invention may indicate visual information, which need not necessarily correspond to data carried by the predetermined RF signal. Similarly, any structure(s) of the present invention may include a variable indicator which visually conveys data to a user (e.g., a color change label may indicate that the container 102, 602, 702—and contents—were held in an environment above a predetermined temperature for more than a predetermined length of time). The RF security device 118, 218, 318, 418, 518, 618, 718 may be disposed on, mounted to, or integrated with any type of object, in any application, that is desired to be identified and/or tamper-protected other than the described structures and objects. A perforation line, a score line, or a punch line need not be linear, but could instead be curvilinear. The deactivation feature 530 does not need to include a pierced or perforated portion of the antenna 520 and/or covering membrane 510, but could instead be a weakened portion of these or another structure of the RF security apparatus 500. The deactivation feature 530 could operate mechanically, electrically, chemically, or in any other fashion. These and other modifications fall within the scope of the present invention, as defined by the appended claims. Accordingly, the present invention is not limited to that precisely as shown and described.

What is claimed is:

1. A radio frequency (RF) security apparatus for a container, the RF security apparatus comprising:
   a metallic covering membrane overlying at least a portion of an opening in the container, the covering membrane having a sealing portion around its periphery configured to be bonded to a mouth of the opening, and an open, through-hole portion surrounded by the sealing portion;
   a non-metallic seal overlying and bonded to the metallic covering membrane and covering the open, through-hole portion, and
   an RF security device disposed over the non-metallic seal, the RF security device being configured to emit a predetermined RF signal in response to an RF interrogation signal,
   wherein the non-metallic seal electrically separates the RF security device from the metallic covering membrane.

2. The RF apparatus of claim 1, wherein the RF security device includes an antenna that compensates for detuning effects imposed by said metallic covering membrane.

3. The RF apparatus of claim 2, wherein the covering membrane is ring-shaped having a sealing portion around its outer circumference and a circular-shaped open portion.

4. The RF apparatus of claim 3, wherein the non-metallic seal provides radial spacing between the antenna of the RF security device and the ring-shaped covering membrane.

5. The RF apparatus of claim 2, further comprising a deactivating feature that includes a weakened wall portion in the antenna of the RF security device.

6. The RF apparatus of claim 1, further comprising a second membrane disposed over the metallic covering membrane and RF security device.

7. The RF apparatus of claim 6, wherein the second membrane is bonded to the metallic covering membrane to form a pocket that the RF security device is able to move within.

8. The RF apparatus of claim 1, wherein the non-metallic seal is impermeable.

9. The RF apparatus of claim 1, wherein the covering membrane is attachable to the container using at least one of an induction heat seal, a pressure sensitive seal, a heat-sealed plastic seal, an interference-fit seal, and an adhesive seal.

10. The RF apparatus of claim 1, wherein the RF security device is one of a radio frequency identification (RFID) tag and an electronic article surveillance (EAS) tag.

11. A radio frequency (RF) security apparatus for a container, the RF security apparatus comprising;
- an annular metallic covering membrane configured to cover an opening of the container, the covering membrane having a sealing portion around its periphery configured to be bonded to a mouth of the opening and a centrally-disposed open portion;
- an impermeable seal bonded around the centrally-disposed open portion of the metallic covering membrane; and
- a radio frequency (RF) device placed between the metallic covering membranes and the non-metallic seal to form the RF security apparatus such that the radio frequency device is spaced apart from the metallic covering membrane.

12. The RF security apparatus of claim 11, including a deactivation feature.

13. The RF security apparatus of claim 12 wherein the deactivation feature includes at least one of a perforation line, a score line, and a punch line.

14. The RF security apparatus of claim 12, wherein the deactivation feature, when activated, causes the RF device to emit a substantively different-radio frequency signal.

15. A radio frequency (RF) security apparatus for a container, the RF security apparatus comprising:
- a metallic covering membrane overlying an opening in the container, the metallic covering membrane having a ring-shaped sealing portion configured to be bonded to a mouth of the opening;
- a seal bonded around the centrally-disposed open portion of the metallic covering membrane;
- an outer cap that covers the covering membrane and the opening; and
- an RF security device coupled to the outer cap, the RF security device being configured to emit a predetermined RF signal in response to an RF interrogation signal,
- wherein the RF security device includes an antenna that compensates for detuning effects imposed by said metallic covering membrane, and
- wherein the ring is metallic, and the metallic ring is configured as part of the RF security device and electrically coupled to induce current in another metallic ring for receiving and emitting the RF signal.

16. The container of claim 15, wherein the metallic covering membrane is attached to the container using at least one of an induction heat seal, a pressure sensitive seal, a heat-sealed plastic seal, an interference-fit seal, and an adhesive seal.

17. The container of claim 15, wherein the RF security device is one of a radio frequency identification (RFID) tag and an electronic article surveillance (EAS) tag.

18. The container of claim 15, further comprising a deactivating feature that includes a weakened wall portion in the antenna of the RF security device.

19. A method of providing a radio frequency (RF) security apparatus for a container, the method comprising:
- providing an annular metallic covering membrane for overlying an opening in the container;
- bonding a metallic sealing portion of the covering membrane to a mouth of the opening;
- overlaying the covering membrane with a non-metallic seal;
- coupling an RF security device to the non-metallic seal such that the RF security device is spaced apart from the metallic sealing portion of the covering membrane, the RF security device being configured to emit a predetermined RF signal in response to an RF interrogation signal.

20. The method of claim 19, wherein the method further comprises designing an antenna of the RF security device to account for transmission interference due to the ring.

21. The method of claim 19, wherein the bonding a sealing portion of the covering membrane to a mouth of the opening comprises using at least one of an induction heat seal, a pressure sensitive seal, a heat-sealed plastic seal, an interference-fit seal, and an adhesive seal.

22. The method of claim 19, wherein the RF security device is one of a radio frequency identification (RFID) tag and an electronic article surveillance (EAS) tag.

23. The method of claim 19, further comprising the step of providing a weakened wall portion in the antenna of the RF security device which, when broken, causes the RF device to emit a substantively different-radio frequency signal than said predetermined signal.

* * * * *